(12) United States Patent
Brun et al.

(10) Patent No.: US 8,153,938 B2
(45) Date of Patent: Apr. 10, 2012

(54) ADDED ELECTRICAL HEATER FOR A HEATING SYSTEM OR AIR CONDITIONER OF A MOTOR VEHICLE

(75) Inventors: Michel Brun, Rustenhart (FR); Geoffrey Denny, Rixheim (FR); Gerard Eckerlen, Rouffach (FR); Erwan Gogmos, Puteaux (FR); Michael Kohl, Bietigheim (DE); Walter Kreuzer, Leonberg (DE); Pascal Miss, Sélestat (FR); Mathieu Mougey, Ensisheim (FR); Jürgen Otto, Illingen (DE); Christophe Schmittheisler, Epfig (FR)

(73) Assignees: Behr GmbH & Co. KG, Stuttgart (DE); Behr France Rouffach SAS, Rouffach (FR)

( * ) Notice: Subject to any disclaimer, the term of this patent is extended or adjusted under 35 U.S.C. 154(b) by 1107 days.

(21) Appl. No.: 11/911,776

(22) PCT Filed: Mar. 23, 2006

(86) PCT No.: PCT/EP2006/002658
§ 371 (c)(1),
(2), (4) Date: Jan. 30, 2008

(87) PCT Pub. No.: WO2006/111240
PCT Pub. Date: Oct. 26, 2006

(65) Prior Publication Data
US 2008/0135535 A1 Jun. 12, 2008

(30) Foreign Application Priority Data
Apr. 21, 2005 (EP) .................................. 05290907

(51) Int. Cl.
*H05B 1/02* (2006.01)
(52) U.S. Cl. .......... 219/504; 219/202; 219/537; 219/552
(58) Field of Classification Search .................. 219/494, 219/504, 505, 202–206, 520–553
See application file for complete search history.

(56) References Cited

U.S. PATENT DOCUMENTS

| | | | |
|---|---|---|---|
| 4,264,888 A | | 4/1981 | Berg |
| 4,635,026 A | * | 1/1987 | Takeuchi .................. 338/22 SD |
| 5,995,711 A | * | 11/1999 | Fukuoka et al. .............. 392/347 |
| 6,124,570 A | * | 9/2000 | Ebner et al. .................... 219/202 |
| 7,098,429 B2 | | 8/2006 | Angermann et al. |
| 2004/0252986 A1 | | 12/2004 | Ito et al. |
| 2005/0150885 A1 | | 7/2005 | Angermann et al. |

(Continued)

FOREIGN PATENT DOCUMENTS
DE 198 04 496 A1 8/1999
(Continued)

OTHER PUBLICATIONS
Office Action mailed May 24, 2011 in related Japanese application No. 2008-506951 (5 pages).

*Primary Examiner* — Mark Paschall
(74) *Attorney, Agent, or Firm* — Foley & Lardner LLP

(57) ABSTRACT

The invention relates to an added electrical heater (1), especially for a heating system or air conditioner of a motor vehicle. A plurality of heating elements (2) are provided which are formed by PTC elements while being fitted with at least one electrically conducting coating (3).

14 Claims, 14 Drawing Sheets

U.S. PATENT DOCUMENTS

2006/0013574 A1  1/2006  Ito et al.

FOREIGN PATENT DOCUMENTS

| | | |
|---|---|---|
| DE | 100 12 675 A1 | 9/2001 |
| DE | 10 2004 027 687 A1 | 12/2004 |
| EP | 1 505 118 A1 | 2/2005 |
| JP | 56141392 U | 10/1981 |
| JP | 59081890 A | 5/1984 |
| JP | 1126092 U | 8/1989 |
| JP | 3176982 A | 7/1991 |
| JP | 4321895 A | 11/1992 |
| JP | 546935 U | 6/1993 |
| JP | 5315060 A | 11/1993 |
| JP | 644087 U | 6/1994 |
| JP | 59116959 U | 8/1994 |
| JP | 2001001751 A | 1/2001 |
| JP | 3091172 U | 1/2003 |
| JP | 2005001447 A | 1/2005 |
| WO | WO 03/098124 A1 | 11/2003 |

* cited by examiner

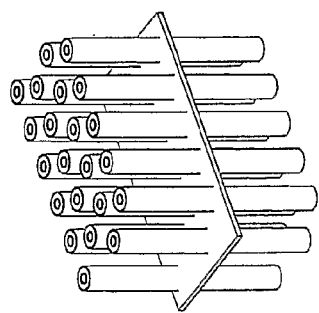
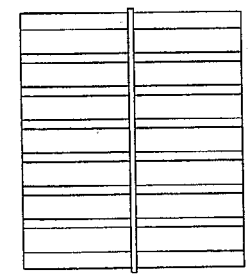
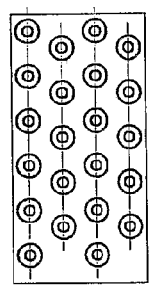
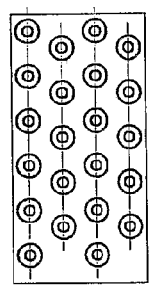
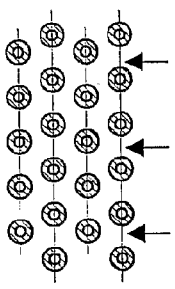
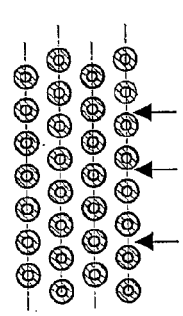

Fig. 15c
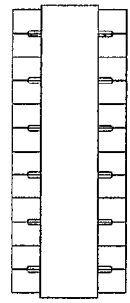 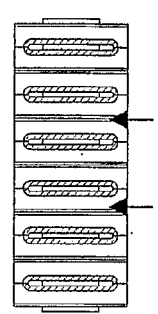# Fig. 15d
Fig. 14b
Fig. 14c

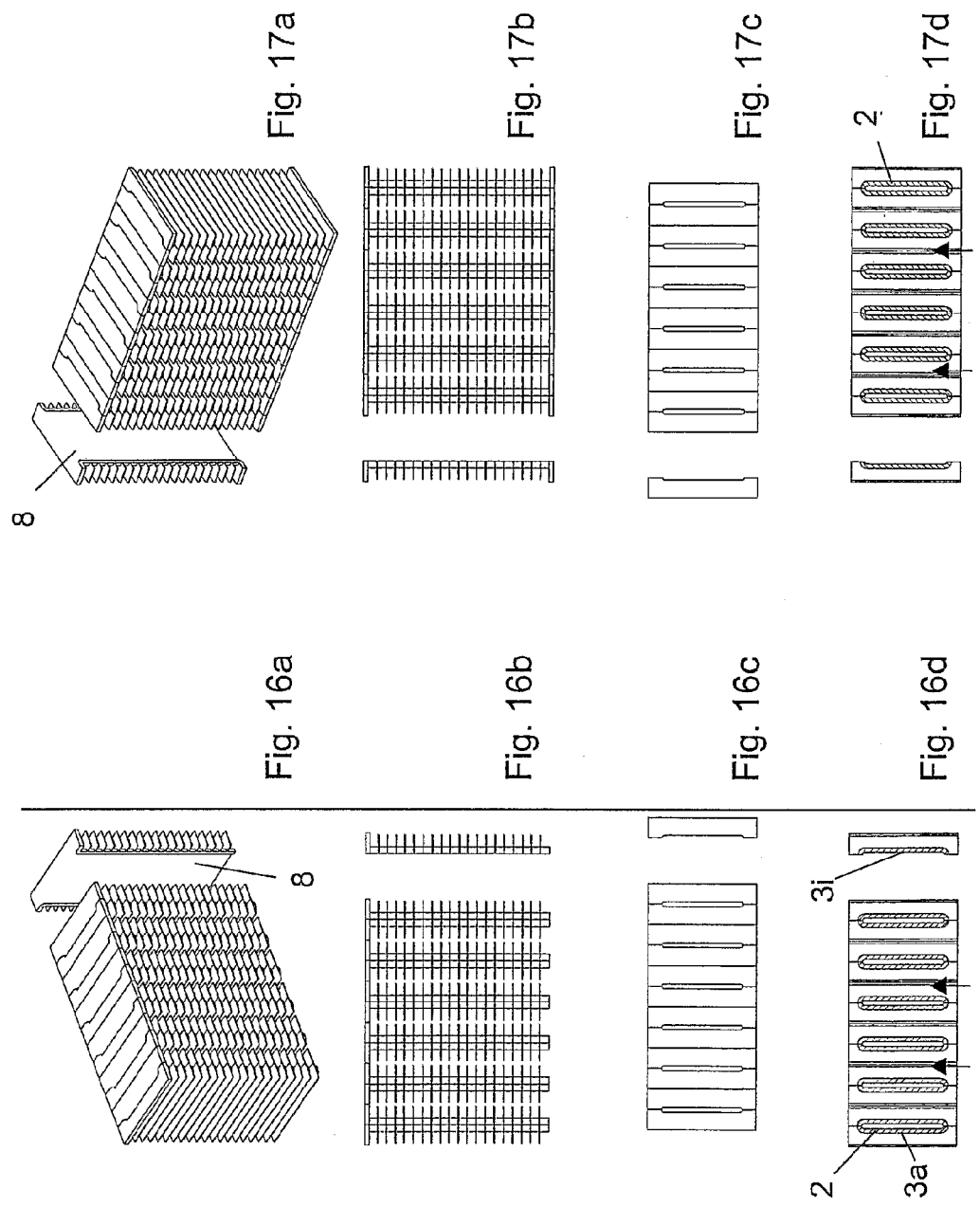

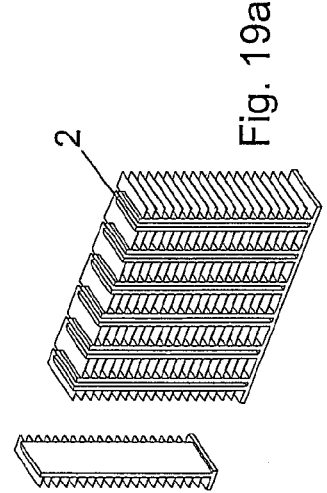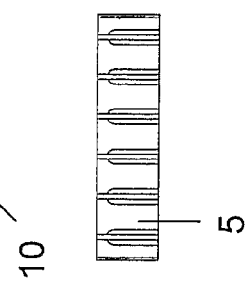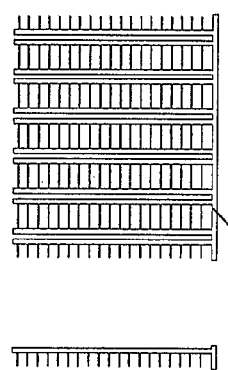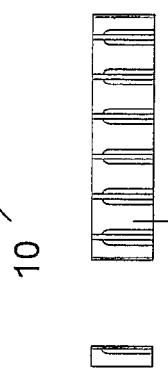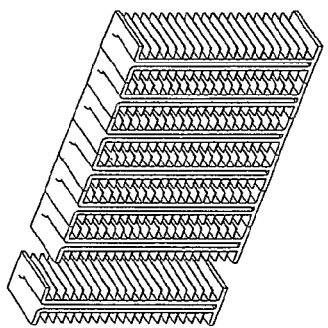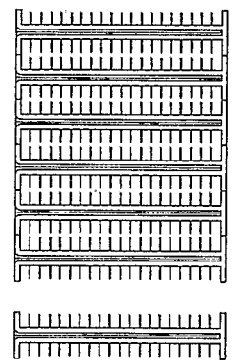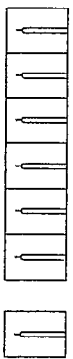
Fig. 19a Fig. 19b Fig. 19c Fig. 19d
Fig. 18a Fig. 18b Fig. 18c Fig. 18d

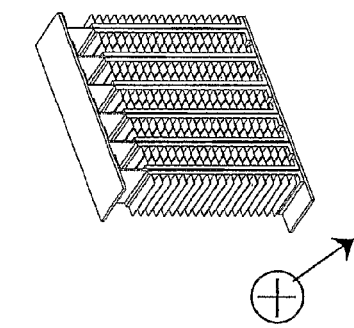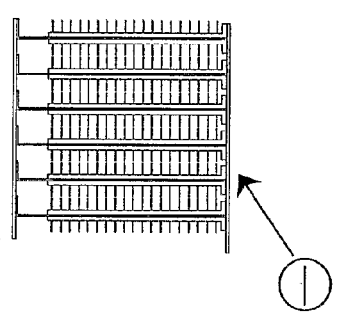
Fig. 21a  Fig. 21b  Fig. 21c  Fig. 21d
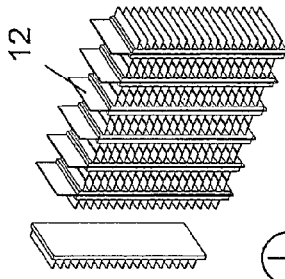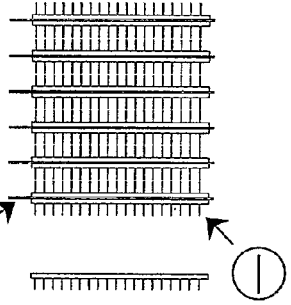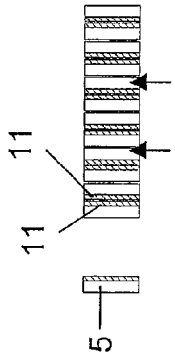
Fig. 20a  Fig. 20b  Fig. 20c  Fig. 20d

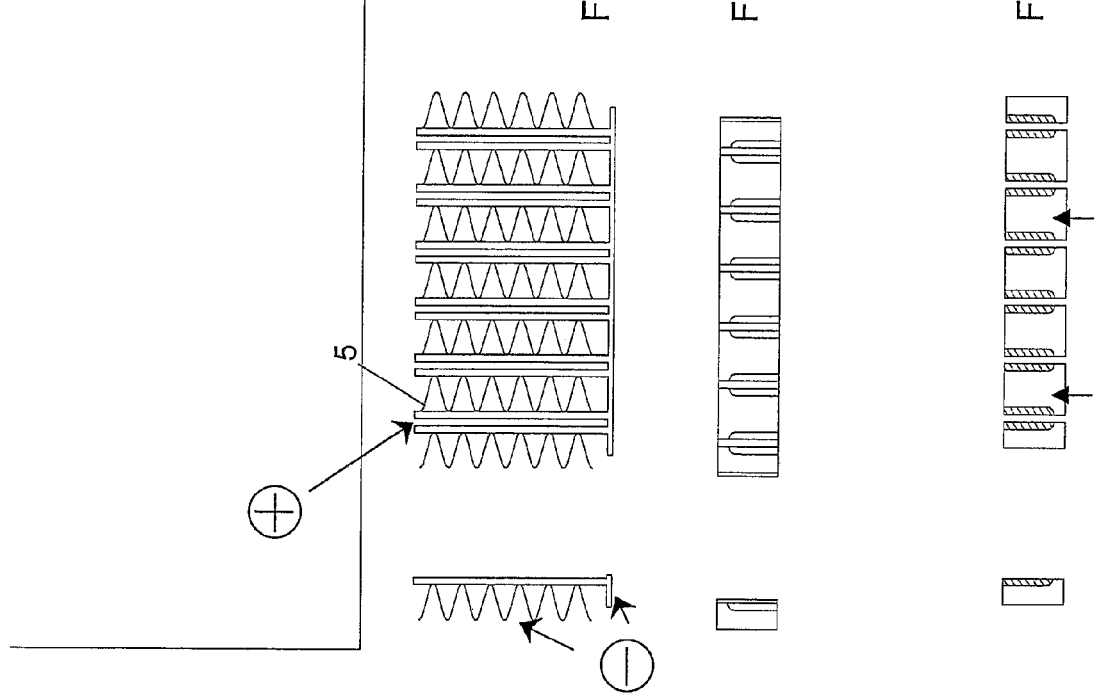

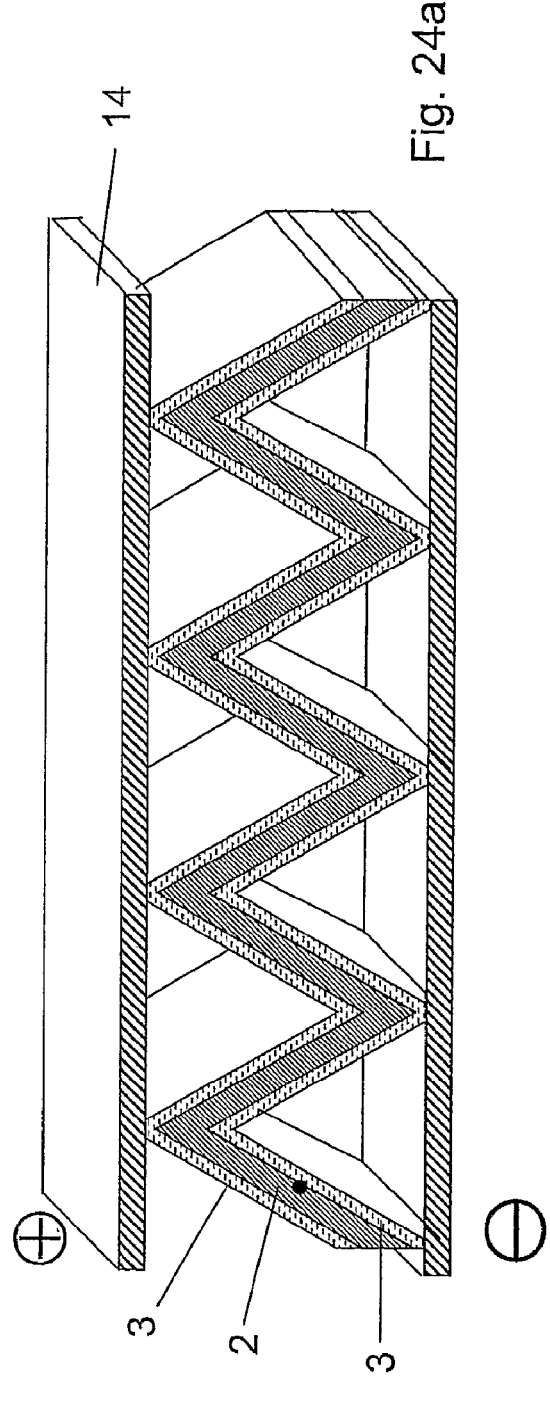
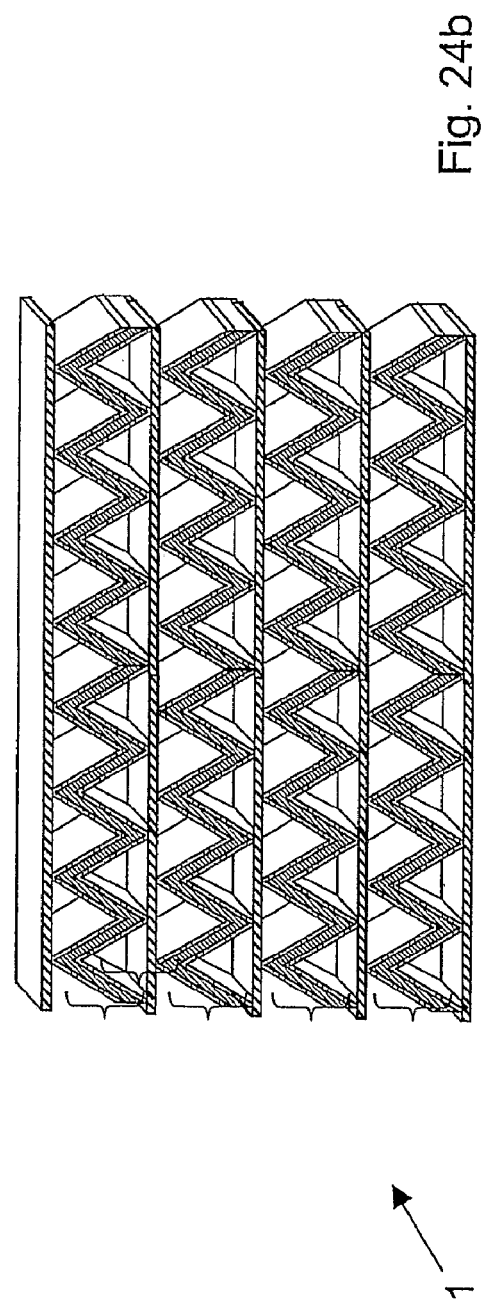
Fig. 24a
Fig. 24b

ADDED ELECTRICAL HEATER FOR A HEATING SYSTEM OR AIR CONDITIONER OF A MOTOR VEHICLE

BACKGROUND

The invention relates to an additional electric heater, in particular for a heating or air-conditioning system of a motor vehicle.

In low-consumption vehicles the low level of heating which is available makes it necessary to provide additional heating power to heat up the passenger compartment and to rapidly remove precipitation (ice or water), in particular from the windshield. To do this it is known, in the case of heat exchangers which are constructed from flat tubes through which a heat transfer medium flows which outputs heat in the case of heating, to provide an additional heating means in the form of PTC heating elements at least on the outermost tubes, these elements being generally ceramic PTC assemblies which usually have a surface temperature of between 110 and 160° C. irrespective of the peripheral conditions such as applied voltage, nominal resistance, air flow. Owing to restrictions in the shaping and geometry, the mounting or the design of an additional electric heater is extremely costly. In addition, the ceramic PTC assemblies are relatively heavy.

WO 03/098124 A1 discloses a heat exchanger with an additional electric heater having a plurality of flat tubes which are arranged parallel to one another and through which a heat transfer medium flows, wherein at least some of the flat tubes are assigned a heating element as an additional heating means which is mounted after the heat exchanger has been soldered, is operated electrically and is mounted by means of a securing element on the end side of the heat exchanger with respect to the corresponding flat tube and so as to extend parallel to the latter by means of the securing element which also extends parallel to the flat tube. In this context, a polymer PTC material which is composed of a film and is placed around a central electrode in a U shape can be used, said material just filling, with a slight pressing tension, the space within the securing grill. In this context, the securing grill is at an intermediate potential and has to be electrically insulated from the heating element. However, such a configuration is not entirely satisfactory.

In addition, DE 10 2004 027 687 A1 discloses an electric heating device having a plurality of heating element panels which are arranged parallel to one another in order to define an air duct between two adjacent heating element panels, a positive electrode element which is connected to one end side of each heating element panel and a negative electrode element which is connected to the other end side of each heating element panel. The heating element panels are, for example, electrically conductive resin into which an electrically conductive filling material is mixed. In this context, the electrically conductive resin generally has a positive resistance/temperature characteristic curve in which the electrical resistance rises at a predetermined temperature or above said temperature. The current flows here from one electrode element through the heating element panels to the other electrode element.

BRIEF SUMMARY

Taking this prior art as a basis, the object of the invention is to make available an improved additional electric heater. This object is achieved by means of an additional electric heater, in particular for a heating or air-conditioning system of a motor vehicle.

According to the invention, an additional electric heater is provided, in particular for a heating or air-conditioning system of a motor vehicle, wherein a plurality of heating elements are provided which are formed by PTC elements, and the heating elements are provided with at least one electrically conductive surface coating, referred to below as coating. Providing an electrically conductive coating simplifies the current supply and/or current discharge so that contact over a large area can be dispensed with, which reduces the manufacturing costs and also the weight of the additional heater. The PTC elements are preferably provided with two electrically conductive coatings which are spatially separated from one another by the PTC element. Here, the coatings are arranged in such a way that there is a flow over the largest possible area through the PTC element and as a result it is correspondingly heated. In order to prevent non-uniform heating, the thickness and thus the distance between the two coatings of the PTC element are correspondingly made as constant as possible.

The PTC elements are preferably formed by plastic elements with PTC properties which can be manufactured more easily and in a more flexible way than the known ceramic PTC elements.

The PTC elements preferably have a hollow profile, wherein the hollow profile can also be formed from a plurality of assembled parts. In particular hollow-cylindrical or flat tube-like profiles are possible as hollow profile, but the shapes are not restricted.

The heating element can be embodied divided into a plurality of parts, in particular two parts, in the longitudinal direction. In this context, the parts can be embodied, for example, as half shells, but it is necessary to ensure that an electrically conductive coating of the outside does not come into contact with the electrically conductive coating of the inside, in order to avoid a short-circuit. The heating element can also be formed by two panels, wherein the panels can also have a structured configuration which serves in particular to space them apart.

The electrically conductive coating is preferably formed by a metallic coating, in particular by a silver, aluminum, copper or gold layer which can be applied by any desired method, for example by means of dipping, PVD or CVD methods. Alternatively, it is also possible to provide metal foils as electrically conductive coatings, metal foils made of aluminum, an aluminum alloy, copper or a copper alloy being particularly suitable.

For reasons of protection against short-circuits in a motor vehicle, the outer electrically conductive coating is preferably connected to the negative pole and/or the inner electrically conductive coating is preferably connected to the positive pole.

The heating element is preferably composed of plastic with PTC properties, in particular of a polymer, in particular preferably a polyolefin, with electrically conductive filling materials, in particular with carbon, in particular in the form of soot particles. Providing a plastic PTC heating element increases the possible variety of shapes and permits the flow paths for the medium which is to be heated through the additional heater to be optimized. In addition to air, it is also possible to heat other media, in particular gases or fluids which are not electrically conductive or are electrically conductive only to a minimum degree, for example an oil, in a corresponding additional heater.

The surface around which the medium which is to be heated flows is preferably provided with a surface-enlarging structured configuration which can be directly integrally molded on.

The surface-enlarging structured configuration can alternatively also be formed by panels or corrugated ribs which are good conductors of heat and which are fitted onto or between the heating elements. These are preferably sheet metal panels, in particular made of aluminum, copper or silver, which are good conductors of heat.

BRIEF DESCRIPTION OF THE DRAWINGS

The invention is explained in detail below by means of a plurality of exemplary embodiments and with reference to the drawing, in which:

FIGS. 1a-1e show schematically illustrated details of an additional electric heater according to the first exemplary embodiment in various views, FIGS. 2a-2d show schematically illustrated details of a variant of the first exemplary embodiment in various views, FIGS. 14a-d show schematically illustrated details of an additional electric heater according to the sixth exemplary embodiment in various views, with the last part of a heating element being illustrated once more individually on the right, FIGS. 15a-d show schematically illustrated details of a first variant of the sixth exemplary embodiment in various views, with the last part of a heating element being illustrated once more individually on the right, FIGS. 16a-d show schematically illustrated details of a second variant of the sixth exemplary embodiment in various views, with the last part of a heating element being illustrated once more individually on the right, FIGS. 17a-d show schematically illustrated details of a third variant of the sixth exemplary embodiment in various views, with the last part of a heating element being illustrated once more individually on the left, FIGS. 18a-d show sectional and schematically illustrated details of the sixth exemplary embodiment from FIGS. 14a to 14d in various views, with the last part of a heating element being illustrated once more individually on the right, FIGS. 19a-d show schematically illustrated details of a fourth variant of the sixth exemplary embodiment in various views, with the last part of a heating element being illustrated once more individually on the right, FIGS. 20a-d show schematically illustrated details of an additional electric heater according to the seventh exemplary embodiment in various views, with the last part of a heating element being illustrated once more individually on the right, FIGS. 21a-d show schematically illustrated details of a first variant of the seventh exemplary embodiment in various views, FIGS. 22a-c show detailed views of a refinement of the fourth variant of the sixth exemplary embodiment (FIGS. 19a-d), FIG. 24a shows a detail of a schematically illustrated additional electric heater according to the ninth exemplary embodiment, with just one heating element being illustrated, and FIG. 24b is a schematic illustration of the additional heater from FIG. 24a, with a plurality of heating elements being illustrated.

DETAILED DESCRIPTION

Figure 1A:
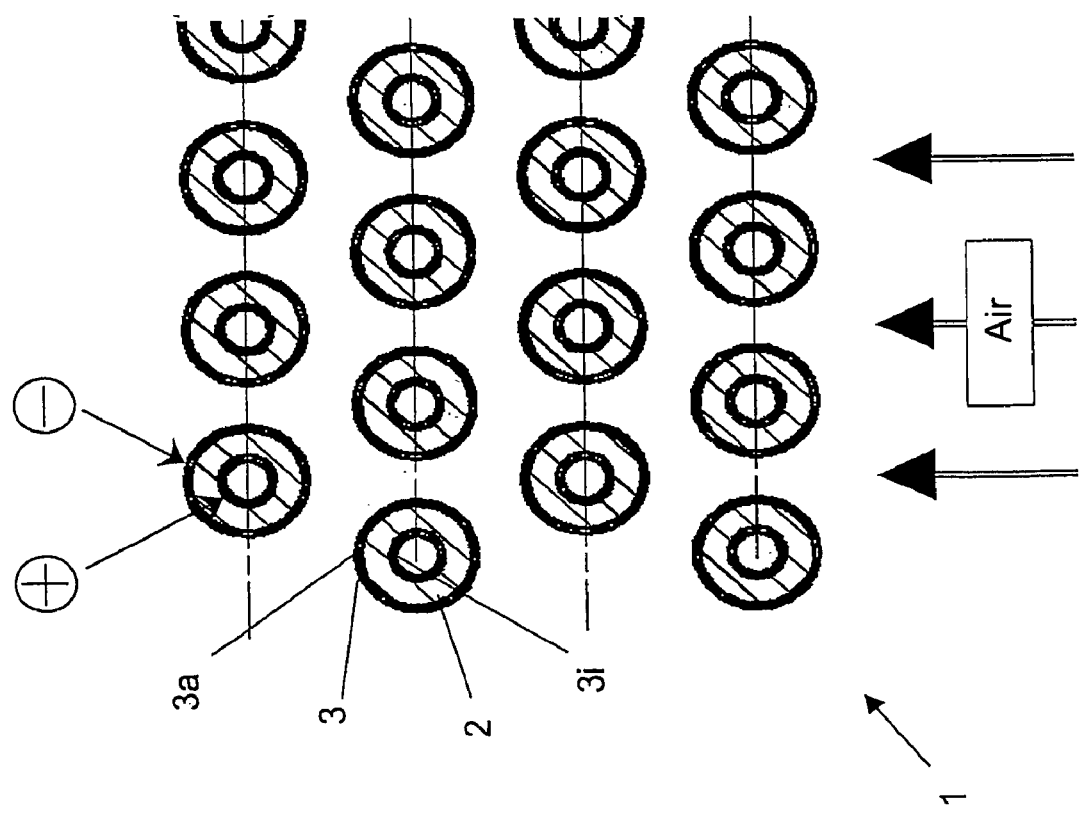

An additional electric heater 1 for a motor vehicle air-conditioning system (not illustrated) is composed, according to the first exemplary embodiment illustrated in FIGS. 1a to 1e, of a plurality of heating elements 2 which are arranged in a packet and constructed in the form of round tubes from a plastic with PTC properties, in the present case of a polyolefin with soot particles. The heating elements 2 are arranged here downstream of the heater in the air stream flowing through the motor vehicle air-conditioning system, indicated by arrows.

The individual heating elements 2 which are manufactured by means of injection molding are electrically conductively coated on the inside and outside (coatings 3), wherein, for reasons of protection against short-circuits in the motor vehicle, the inner coating 3i is connected here to the positive pole, and the outer coating 3a to the negative pole of the voltage source. The electrically conductive (surface) coating has been applied by means of a PVD method, and according to the first exemplary embodiment it is formed by a thin layer of silver. Here, the inner coating 3i and the outer coating 3a are spaced apart from one another in such a way that an electrical short-circuit is ruled out.

According to the first exemplary embodiment, a panel 4, which serves as an injection molding panel for the manufacture of the individual heating elements 2, is provided in the center, but it does not necessarily need to be arranged in the center.

If a voltage, for example a voltage of up to 42 V from a 42 V on-board power system, is present, power can be supplied and distributed in a relatively loss-free way through the individual heating elements 2 via the electrically conductive coatings, and there is subsequently a transverse flow through the PTC material, in which case heat is generated owing to the electrical resistance. In this context, the electrical resistance is dependent on the heat owing to the PTC properties so that the heating elements 2 have self-regulating properties. Power is then discharged in a relatively loss-free fashion via the other coating 3 so that heat is essentially generated only in the desired regions.

In the variant of the first exemplary embodiment which is illustrated in FIGS. 2a to 2d, the individual heating elements 2 are spaced apart from one another further so that the maximum pressure drop on the air side is reduced, but with a reduced, heat-transmitting surface. Otherwise, the variant corresponds to the first exemplary embodiment.

According to the second exemplary embodiment, flat tubes are provided as the heating elements 2 instead of round tubes, said tubes being correspondingly arranged in order to provide the smallest possible air resistance. In this case also, the tubes are provided on the inside and outside with an electric coating 3, and in this case by means of a copper layer which has been applied by dipping. The electric wiring corresponds to that in the first exemplary embodiment.

Figure 4A:
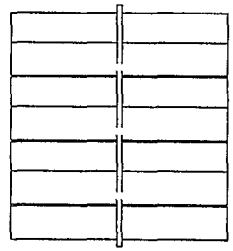
FIGS. 4a-d show schematically illustrated details of a variant of the second exemplary embodiment in various views.
Figure 4B:
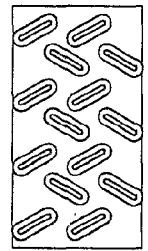
Figure 4C:
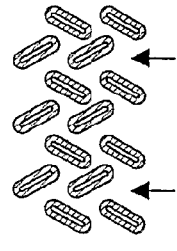
Figure 4D:
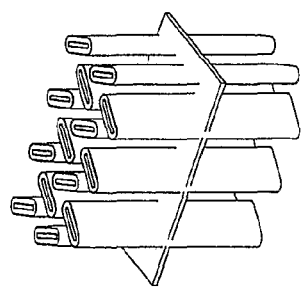
Figure 3A:
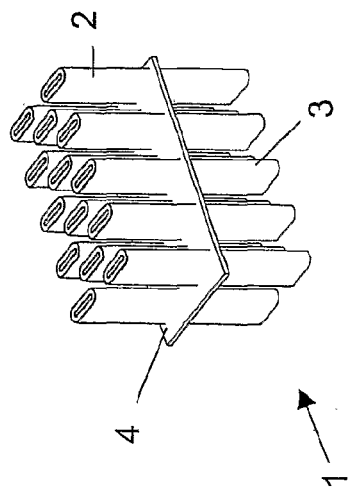
FIGS. 3a-d show schematically illustrated details of an additional electric heater according to the second exemplary embodiment in various views.
Figure 3B:
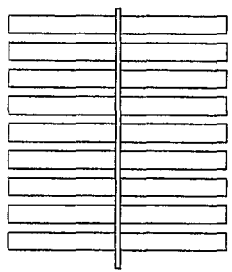
Figure 3C:
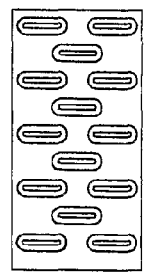
Figure 3D:
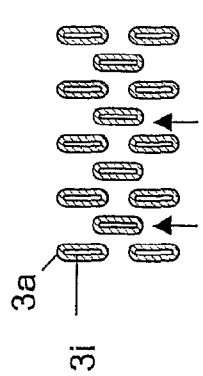

The flat tubes can also be aligned in different ways, for example in the manner of fish bones according to the variant of the second exemplary embodiment illustrated in FIGS. 4a to 4d so that, for example, selective eddying of the throughflowing air is generated.

In addition to the embodiments of the tubes illustrated in the drawing, any other desired geometries are also possible, for example drop-shaped or triangle-shaped geometries. A combination of different geometries and/or different distances between the heating elements and/or different alignments of the heating elements in an additional electric heater is also possible, for example also as a function of individual climatic zones in multi-zone motor vehicle air-conditioning systems.

Figure 5A:
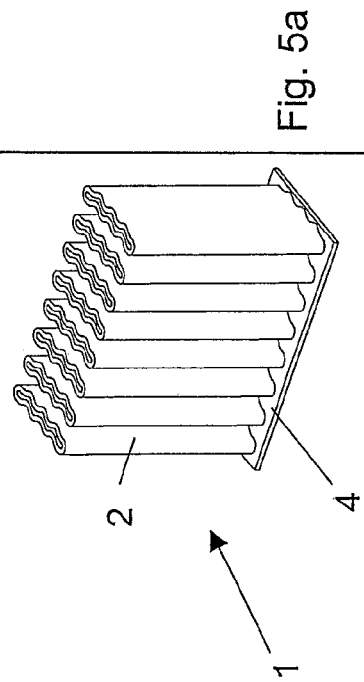
FIGS. 5a-d show schematically illustrated details of an additional electric heater according to the third exemplary embodiment in various views.
Figure 5B:
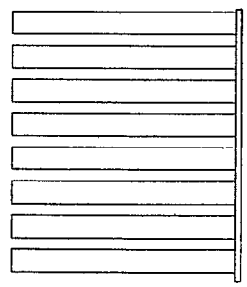
Figure 5C:
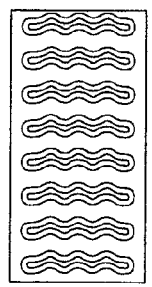
Figure 5D:
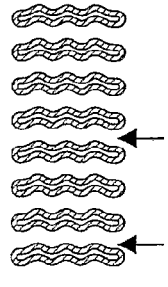

According to the third exemplary embodiment illustrated in FIGS. 5a to 5d, the heating elements 2 which are embodied in the manner of flat tubes are designed with a structured configuration 5 in order to permit improved transfer of heat to the through-flowing air. According to the third exemplary embodiment, a panel 4 is again provided for the injection molding of the heating elements 2, but this time, in contrast to the first exemplary embodiment, it is provided at one end of the heating elements 2. According to the third exemplary embodiment, an aluminum layer, which has been applied by means of a CVD method, is provided on the inner face and outer face of the heating elements 2.

Figure 6A:
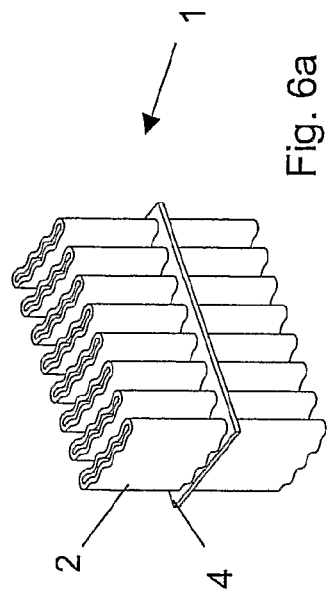
FIGS. 6a-d show schematically illustrated details of a variant of the third exemplary embodiment in various views.
Figure 6B:
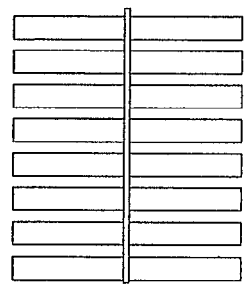
Figure 6C:
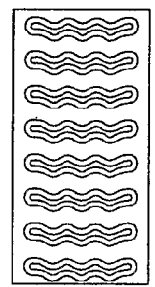
Figure 6D:
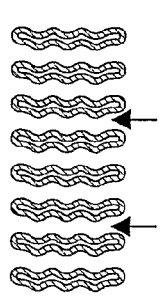

In the variant of the third exemplary embodiment which is illustrated in FIGS. 6a to 6d, the panel 4 is arranged centrally in accordance with the first exemplary embodiment.

Figure 7A:
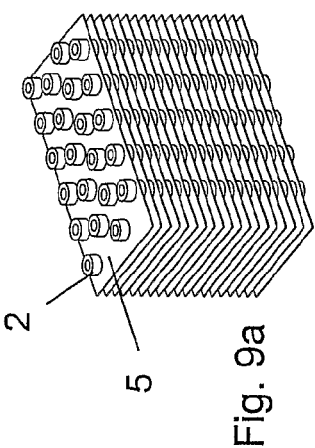
FIGS. 7a-d show schematically illustrated details of an additional electric heater according to the fourth exemplary embodiment in various views.
Figure 7B:
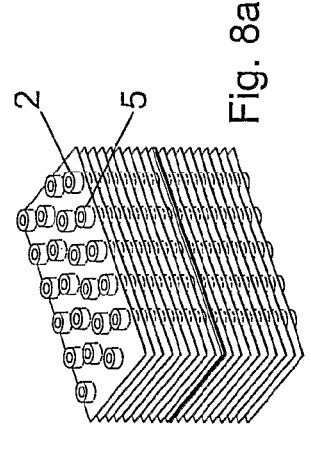
Figure 7C:
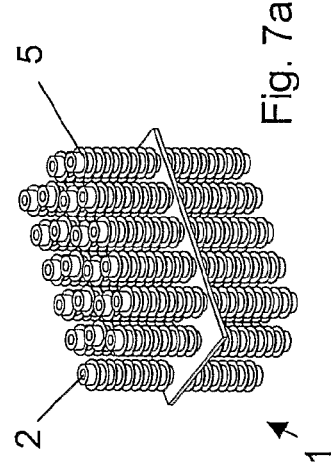
Figure 7D:
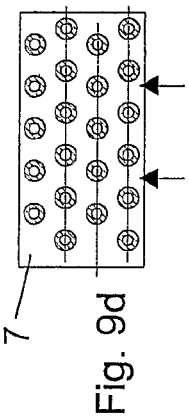

In FIGS. 7a to 7d, the fourth exemplary embodiment is illustrated, the heat-transferring surface of the individual heating elements 2 which are embodied as round tubes here being enlarged by flat disks 6, with a circular shape, which are also injection molded within the scope of the manufacture of the heating elements 2. The electrically conductive outer coating 3a is also provided here continuously on the surfaces and on the outer circumference of the disks 6.

Figure 8A:
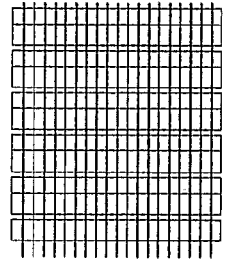
FIGS. 8a-d show schematically illustrated details of a first variant of the fourth exemplary embodiment in various views.
Figure 8B:
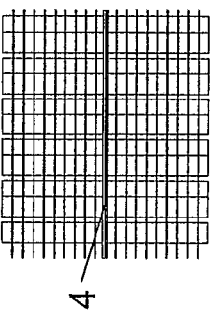
Figure 8C:
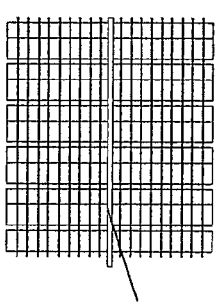
Figure 8D:
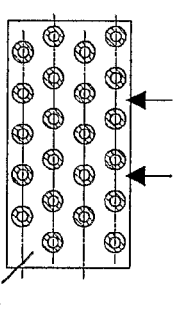

According to the first variant of the fourth exemplary embodiment which is illustrated in FIGS. 8a to 8d, panels 7 which are fitted subsequently over the round tubes serving as heating elements 2 are provided instead of the disks 6 which are also injection molded, said panels 7 being designed to hold the tubes with a plurality of circular openings. According to the first variant, the panels 7 here are composed of the same material as the heating elements 2. The individual tubes are, as in the first exemplary embodiment, integrally injection molded onto both sides of an injection molding panel 5, with the manufacture being as a composite here.

Figure 9A:
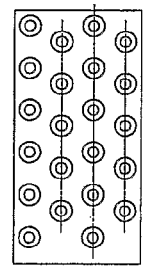
FIGS. 9a-d show schematically illustrated details of a second variant of the fourth exemplary embodiment in various views.
Figure 9B:
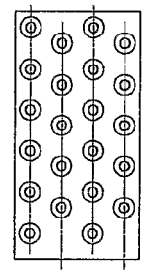
Figure 9C:
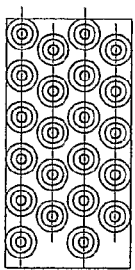
Figure 9D:
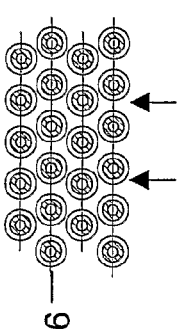

The round tubes according to the second variant illustrated in FIGS. 9a to 9d which serve as heating elements 2 are manufactured individually and introduced into circular openings which are bored or punched into aluminum panels 7 which serve as ribs. In this context, the ribs are arranged spaced apart from one another. It is possible to dispense with an injection molding panel 4.

According to a further variant (not illustrated in the drawing), gills can be additionally provided on the aluminum panels in order to improve the transfer of heat further.

Figure 10A:
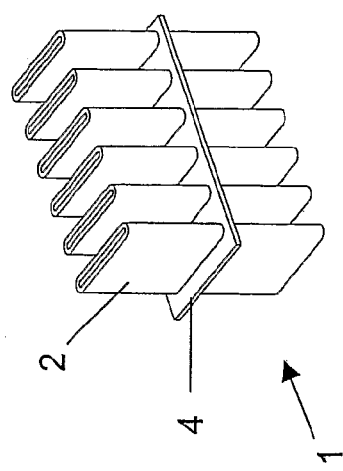
FIGS. 10a-d show schematically illustrated details of an additional electric heater according to the fifth exemplary embodiment in various views.
Figure 10B:
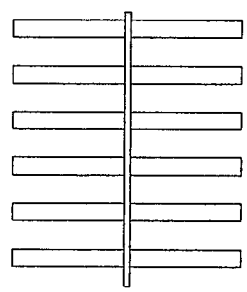
Figure 10C:
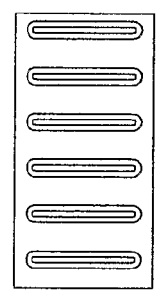
Figure 10D:
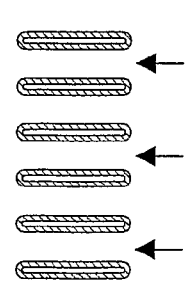

FIGS. 10a to 10d show various views of the fifth exemplary embodiment according to which a single row, running perpendicularly to the direction of flow, of PTC heating elements 2 which are embodied in the manner of flat tubes are provided, the longitudinal sides of which PTC heating elements 2 each point to the adjacent heating element 2. In turn, an injection molding panel 4 is provided in the center. In accordance with the previous exemplary embodiments, the heating elements 2 are provided on the outside and inside with an electrically conductive coating, with the outer coating being connected to the negative pole and the inner coating being connected to the positive pole.

Figure 11A:
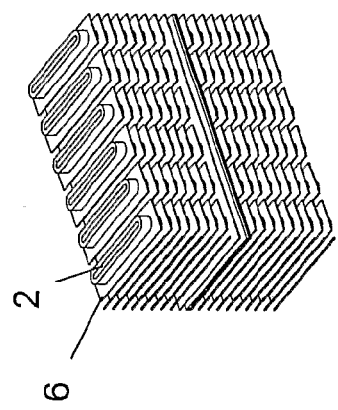
FIGS. 11a-d show schematically illustrated details of a first variant of the fifth exemplary embodiment in various views.
Figure 11B:
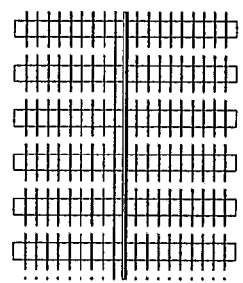
Figure 11C:
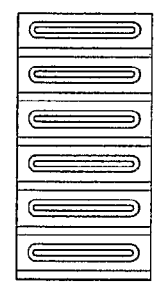
Figure 11D:
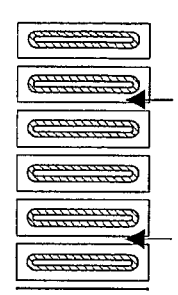

According to a first variant of the fifth exemplary embodiment which is illustrated in FIGS. 11a to 11d, the heating elements 2 have, essentially in accordance with the fourth exemplary embodiment, enlarged, heat-transferring surfaces which are enlarged by flat plates 6 with an approximately rectangular shape, which are also injection molded onto the individual heating elements 2 within the scope of the manufacture of said heating elements 2. The individual plates 6 are each arranged spaced apart from one another. The electrically conductive outer coating 3a is in turn provided so as to also extend over all of the surfaces and the outer sides of the plates 6.

Figure 12A:
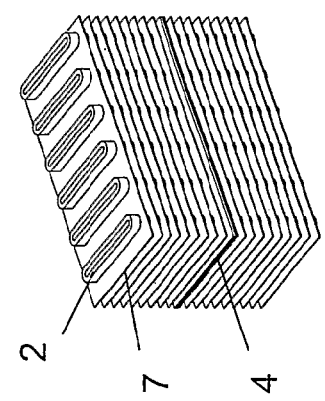
FIGS. 12a-d show schematically illustrated details of a second variant of the fifth exemplary embodiment in various views.
Figure 12B:
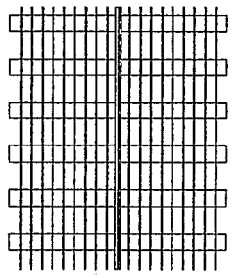
Figure 12C:
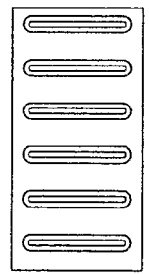
Figure 12D:
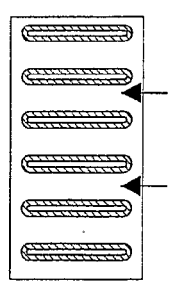

In a second variant of the fifth exemplary embodiment which is illustrated in FIGS. 12a to 12d, panels 7 which extend over all the surfaces instead of the plates 6 are provided with openings which correspond to the shape of the heating elements 2 in order to enlarge the heat-transferring surface, which openings are fitted onto the heating elements 2 which are manufactured as a composite here (injection molding panel 5).

Figure 13A:
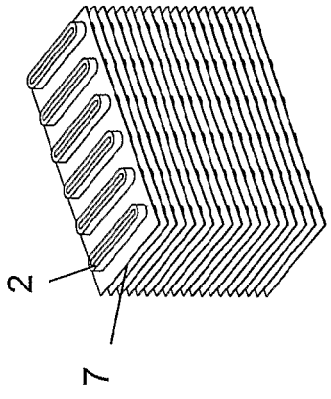
FIGS. 13a-d show schematically illustrated details of a third variant of the fifth exemplary embodiment in various views.
Figure 13B:
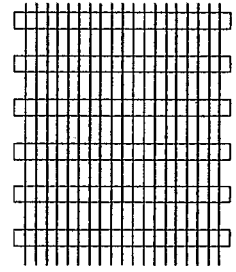
Figure 13C:
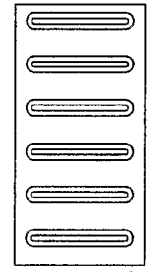
Figure 13D:
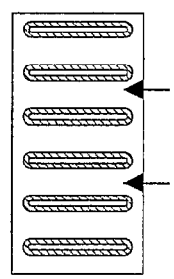

According to a third variant of the fifth exemplary embodiment which is illustrated in FIGS. 13a to 13d, the injection molding panel 5 is dispensed with since the individual heating elements 2 are manufactured separately and are positioned and connected to one another by means of the panels 7.

According to a fourth variant of the fifth exemplary embodiment, instead of approximately rectangular plates 6 which are also injection molded on (cf. first variant of the fifth exemplary embodiment), correspondingly embodied aluminum plates which have openings for the heating elements 2 are fitted onto the individual heating elements after they have been electrically conductively coated.

Figure 14A:
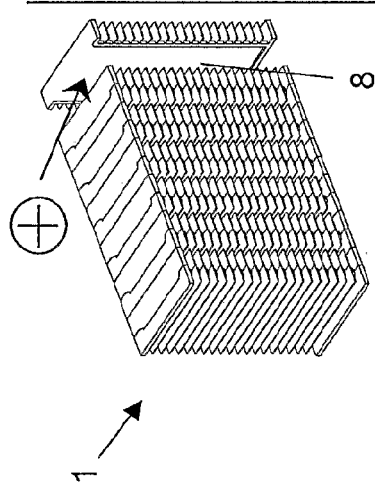
Figure 14D:
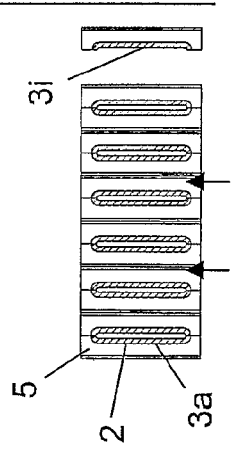

FIGS. 14a to 14d and 18a to 18d show the sixth exemplary embodiment which corresponds, in the assembled form, approximately to the first variant of the fifth exemplary embodiment. Here, the individual heating elements 2 are not formed by continuous hollow profiles but rather by assembled half shells 8 on which surface-enlarging structured configurations 5 are formed. The half shells 8 are closed on one side (cf. FIG. 14a), with the underside, which is provided with the outer coating 3a like the entire lateral outer surface, being connected on the outside to the negative pole. The upper side is of open design, with the inner coating 3i extending as far as the upper side and being connected to the positive pole. Here, the coatings 3a and 3i are provided spaced apart from one another on the upper side so that no electrical short-circuit takes place. In addition, the end faces of the half shells 8 which are in contact with one another are not electrically conductively coated.

Figure 15A:
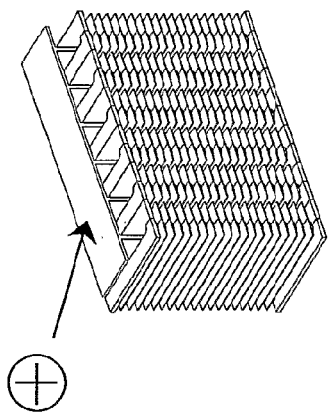
Figure 15B:
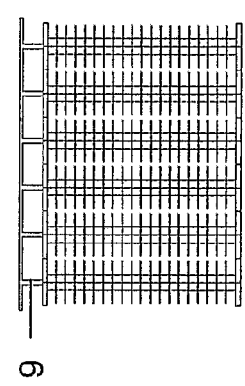

According to the first variant of the sixth exemplary embodiment which is illustrated in FIGS. 15a to 15d, electrical contact is formed with the inner coating 3i by means of contacting rails 9 which are inserted inwardly and are connected to the positive pole. Otherwise, the variant corresponds to the sixth exemplary embodiment.

In accordance with the second variant of the sixth exemplary embodiment which is illustrated in FIGS. 16*a* to 16*d*, the heating elements 2 which are formed by two half shells 8 are of open design on both sides, with the heating elements 2 ending just at the bottom. According to the third variant of the sixth exemplary embodiment, the heating elements 2 end at the bottom and at the top with a laterally extended edge whose lateral dimensions correspond to those of the surface-enlarging structured configurations 5.

The fourth variant (illustrated in FIGS. 19*a* to 19*d*) of the sixth exemplary embodiment corresponds essentially to the sixth exemplary embodiment, but no connections of the flat-tube shaped heating elements 2 are provided on the upper side. The composite is held together at the bottom by a connecting panel 10. Alternatively or additionally, improved cohesion is possible by means of surface-enlarging structured configurations 5 which are embodied as panels.

Detailed illustrations of a modification of the fourth variant of the sixth exemplary embodiment are given in FIGS. 22*a* to 22*c*, wherein no planar panels are provided for enlarging the surface but rather a corrugated rib, which can also be embodied with gills, is provided as the structured configuration 5 of the surface.

In accordance with the additional electric heater 1 which is illustrated in FIGS. 20*a* to 20*d* according to the seventh exemplary embodiment, instead of half shells individual heating panels 11 made of PTC material are provided, said heating panels 11 being provided with an electrically conductive coating 3 on the sides which lie opposite one another, wherein no electrical connection is provided on the sides of the panels. An electric contact 12 in the form of a piece of sheet metal is inserted between two such heating panels 11 in a way which corresponds to the contacting rails 9 of the first variant of the sixth exemplary embodiment. On the side of the heating panels 11 facing away from the electric contact 12, a corrugated rib made of a bent piece of sheet aluminum is provided as a surface-enlarging structured configuration 5. In this context, the corrugated rib can also be embodied with gills.

In the first variant of the seventh exemplary embodiment which is illustrated in FIGS. 21*a* to 21*d*, the individual heating panels 11 are bent outward at the bottom and away from the electric contact. In this context, the coatings are embodied in such a way that no short-circuit arises between the inserted contact plate (electric contact 12, positive pole) and the negative pole which is provided at the base in the form of a second contact plate.

Figure 23E:
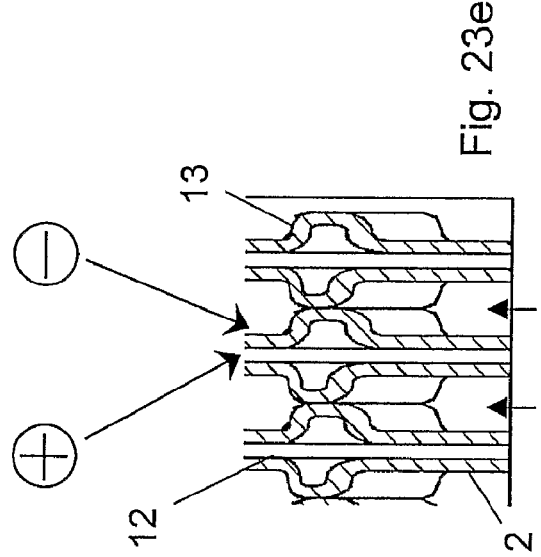
FIGS. 23a-e show schematically illustrated details of an additional electric heater according to the eighth exemplary embodiment in various views.
Figure 23A:
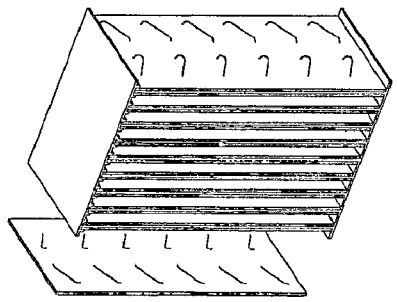
Figure 23B:
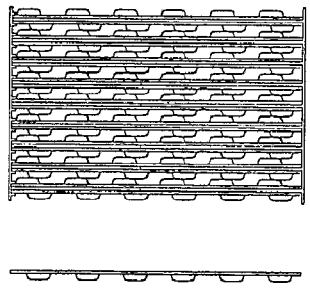
Figure 23C:
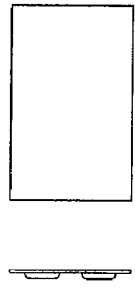
Figure 23D:
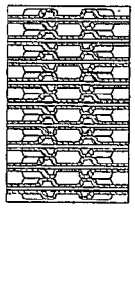

FIGS. 23*a* to 23*e* show an additional electric heater according to the eighth exemplary embodiment. The individual heating elements 2 are composed of individual PTC panels of approximately constant thickness which have, however, structures 13, in the present case elongate, knob-shaped structures. They have in turn an electrically conductive coating 3 on each of their sides, said coatings 3 not being electrically conductively connected to one another.

The structures 13 are embodied in an approximately mirror-inverted fashion with respect to an electric contact 12 arranged between two PTC panels in each case, said structures 13 being formed by one thin sheet metal panel which is arranged in the manner of a comb and is connected to the positive pole. The outer side is connected to the negative pole so that the PTC material of the heating elements 2 has a relatively uniform flow over the panel thickness, as a result of which the heating elements 2 are heated uniformly until the resistance becomes so large, due to the temperature, that no further heating is possible anymore and a stable state is established, with constant emission of heat. The structures 13 determine the distance between two heating elements 2 and thus determine the free intermediate space through which the air to be heated flows. On the other side, the electric contact 12 determines the distance between two PTC panels.

According to the ninth exemplary embodiment which is illustrated in FIGS. 24*a* and 24*b*, the heating elements 2 for an additional electric heater 1 are embodied in a zig-zag shape and are provided on both sides with a coating 3 composed of electrically conductive metal foils. The metal foils here are metal foils made of an aluminum alloy, but other metals/metal alloys, such as in particular ones based on copper, are also possible. On the outer sides of the bending points, the coating 3 makes contact with panel-shaped contact elements 14 which are composed of sheet aluminum plates and are each arranged between two heating elements 2 and on the outer sides of the outermost heating elements 2. The connection is made here by means of bonding, for which an electrically conductive bonding agent is used according to the exemplary embodiment. The contact elements 14 are arranged with alternate polarity.

Due to the metal foils, there is a relatively uniform flow over the entire surface of the heating elements 2 so that uniform heating takes place.

In addition to zig-zag-shaped heating elements 2 it is, of course, also possible to use other structures such as, for example, corrugated, U-shaped or meandering ones. However, in order to ensure that there is a uniform flow, the thickness of the structures, i.e. the minimum distance between the two coatings, should be relatively constant.

The invention claimed is:

1. An electric heater for a heating or air-conditioning system of a motor vehicle, comprising:
    a plurality of hollow, tubular heating elements that are made of a polymer PTC material, each heating element having an inner surface and an outer surface;
    a first electrically conductive coating disposed on the outer surface of each heating element; and
    a second electrically conductive coating disposed on the inner surface of each heating element,
    wherein the heating elements are arranged parallel to one other and are configured to allow a flow of a medium through the electric heater around the heating elements such that the medium directly contacts the first electrically conductive coating.

2. The electric heater as claimed in claim 1, wherein the heating elements are formed of a plurality of assembled parts.

3. The electric heater as claimed in claim 1, wherein the heating elements are formed of two parts attached to one another in a longitudinal direction.

4. The electric heater as claimed in claim 3, wherein the heating elements are formed of two half shells.

5. The electric heater as claimed in claim 4, wherein the half shells that form the heating elements are structured.

6. The electric heater as claimed in claim 1, wherein each of the first and second electrically conductive coatings is formed of a silver, aluminum, copper or gold layer, or of an applied metal foil made of aluminum, an aluminum alloy, copper or a copper alloy.

7. The electric heater as claimed in claim 1, wherein the first electrically conductive coating is connected to a negative pole of a voltage source and the second electrically conductive coating is connected to a positive pole of a voltage source.

8. The electric heater as claimed in claim 1, wherein the polymer PTC material comprises a polyolefin with electrically conductive filling materials.

9. The electric heater as claimed in claim 1, further comprising at least one surface-enlarging structure.

10. The electric heater as claimed in claim 9,
wherein the at least one surface-enlarging structure comprises at least one flat plate or flat disk that is integrally molded onto the outer surface of at least one of the heating elements, and
wherein the first electrically conductive coating is further disposed on an outer surface of the at least one flat plate or flat disk.

11. The electric heater as claimed in claim 9, wherein the at least one surface-enlarging structure comprises at least one panel that is fitted onto the heating elements.

12. The electric heater as claimed in claim 11, wherein the at least one panel comprises a sheet metal panel made of aluminum, copper or silver.

13. The electric heater as claimed in claim 9, wherein the at least one surface-enlarging structure comprises a plurality of corrugated ribs which are fitted between the heating elements.

14. The electric heater as claimed in claim 1, wherein the heating elements have a zig-zag shape or a corrugated shape.

\* \* \* \* \*